US009609608B2

(12) United States Patent
Choi et al.

(10) Patent No.: US 9,609,608 B2
(45) Date of Patent: Mar. 28, 2017

(54) METHOD FOR SUPPORTING DEVICE TO DEVICE SYNCHRONIZATION AND IDENTIFICATION IN WIRELESS ACCESS SYSTEM THAT SUPPORTS DEVICE TO DEVICE COMMUNICATION

(71) Applicant: LG ELECTRONICS INC., Seoul (KR)

(72) Inventors: Jinsoo Choi, Anyang-si (KR); Jiwoong Jang, Anyang-si (KR); Hangyu Cho, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 274 days.

(21) Appl. No.: 14/361,503

(22) PCT Filed: Nov. 29, 2012

(86) PCT No.: PCT/KR2012/010229
§ 371 (c)(1),
(2) Date: May 29, 2014

(87) PCT Pub. No.: WO2013/081393
PCT Pub. Date: Jun. 6, 2013

(65) Prior Publication Data
US 2014/0321452 A1    Oct. 30, 2014

Related U.S. Application Data

(60) Provisional application No. 61/564,861, filed on Nov. 29, 2011.

(51) Int. Cl.
*H04W 4/00* (2009.01)
*H04W 56/00* (2009.01)
(Continued)

(52) U.S. Cl.
CPC ....... *H04W 56/0015* (2013.01); *H04W 4/005* (2013.01); *H04W 8/005* (2013.01);
(Continued)

(58) Field of Classification Search
CPC ............ H04W 4/005; H04W 74/0833; H04W 28/0215; H04W 56/001; H04L 29/08306; H04L 67/104
See application file for complete search history.

(56) References Cited

U.S. PATENT DOCUMENTS

| 2009/0016249 | A1* | 1/2009 | Li | H04J 3/0638 370/310.1 |
| 2010/0135274 | A1* | 6/2010 | Hong | H04B 7/2656 370/345 |

(Continued)

FOREIGN PATENT DOCUMENTS

| KR | 10-2010-0113577 | 10/2010 |
| KR | 10-2011-0092875 | 8/2011 |

OTHER PUBLICATIONS

3rd Generation Partnership Project (3GPP), "Technical Specification Group Radio Access Network; Study on RAN Improvements for Machine-type Communications; (Release 11)," 3GPP TR 37.868 V11.0.0, Sep. 2011, 28 pages.

(Continued)

*Primary Examiner* — Andrew Chriss
*Assistant Examiner* — Salvador E Rivas
(74) *Attorney, Agent, or Firm* — Lee, Hong, Degerman, Kang & Waimey

(57) ABSTRACT

The present invention relates to methods for efficiently performing device to device synchronization and device identification in a device to device communication system, and devices for supporting the methods. The method for supporting device to device synchronization and identification in a wireless access system that supports device to device communication according to one embodiment of the present invention comprises the steps of: allowing a first device to broadcast a RACH signal for device to device synchronization in a peer discovery section; allowing the first device to receive a first response message transmitted (Continued)

from a second device as a response to the RACH signal; and transmitting a message including device identification information for the first device to the second device.

10 Claims, 8 Drawing Sheets

(51) Int. Cl.
H04W 74/08 (2009.01)
H04W 8/00 (2009.01)
H04W 74/00 (2009.01)
H04W 28/02 (2009.01)

(52) U.S. Cl.
CPC ....... *H04W 56/001* (2013.01); *H04W 56/002* (2013.01); *H04W 74/008* (2013.01); *H04W 74/0833* (2013.01); *H04W 28/0215* (2013.01)

(56) References Cited

U.S. PATENT DOCUMENTS

| | | | | |
|---|---|---|---|---|
| 2010/0165882 | A1* | 7/2010 | Palanki | H04W 8/005 370/254 |
| 2011/0222475 | A1* | 9/2011 | Hole | H04W 74/004 370/328 |
| 2012/0147830 | A1* | 6/2012 | Lohr | H04W 72/042 370/329 |
| 2013/0064138 | A1* | 3/2013 | Hakola | H04W 8/005 370/255 |

OTHER PUBLICATIONS

PCT International Application No. PCT/KR2012/010229, Written Opinion of the International Searching Authority dated Mar. 26, 2013, 15 pages.

* cited by examiner

METHOD FOR SUPPORTING DEVICE TO DEVICE SYNCHRONIZATION AND IDENTIFICATION IN WIRELESS ACCESS SYSTEM THAT SUPPORTS DEVICE TO DEVICE COMMUNICATION

CROSS-REFERENCE TO RELATED APPLICATIONS

This application is the National Stage filing under 35 U.S.C. 371 of International Application No. PCT/KR2012/010229, filed on Nov. 29, 2012, which claims the benefit of U.S. Provisional Application Ser. No. 61/564,861 filed on Nov. 29, 2011, the contents of which are all hereby incorporated by reference herein in their entirety.

TECHNICAL FIELD

The present invention relates to a radio access system and, more particularly, to methods for efficiently performing device-to-device synchronization and device identification (that is, peer discovery) in a device-to-device communication system and apparatuses for supporting the same.

BACKGROUND ART

Hereinafter, a device-to-device communication environment of the present invention will be described.

Examples of a device-to-device communication method include a device-to-device (D2D) communication method, a machine-to-machine (M2M) communication method and a peer-to-peer (P2P) communication method. D2D communication means communication between electronic devices. In a broad sense, D2D communication means wired or wireless communication between electronic devices or communication between a machine and a device controlled by a person. However, recently, D2D communication generally means wireless communication between electronic devices performed without human intervention.

In the early 1990's, the concept of device-to-device communication was only recognized as the concept of remote control or telematics and the market therefor was limited. In the past few years, D2D communication has rapidly grown into a market globally attracting considerable attention. In particular, device-to-device communication applies leverage to fields such as fleet management in point of sale (POS) and security application markets, remote monitoring of machines and equipment, and smart meters for measuring operation times of construction equipment and automatically measuring heat or electricity consumption. In the future, device-to-device communication will be variously used in association with existing mobile communication and wireless high-speed Internet or low-power communication solutions such as Wi-Fi and ZigBee and will expand to a Business-to-Consumer (B2C) market as well as a Business-to-Business (B2B) market.

For ease of description, hereinafter, device-to-device communication is referred to as D2D communication. A terminal used for device-to-device communication in a device-to-device communication environment is referred to as a D2D device. Device-to-device communication may be used not only in a communication environment in which only devices exist but also in an environment in which devices and general cellular terminals (e.g., human type communication (HTC) terminals) coexist.

In device-to-device communication, in an environment in which devices and general HTC terminals coexist, D2D devices may perform transmission and reception of data and/or messages using resources allocated by a base station under control of the base station. In this case, the D2D devices should perform synchronization with the base station in advance in order to acquire reference timing and/or basic timing slot information.

At this time, when a D2D device is connected to a cellular network using existing infrastructure, for connection and synchronization with the network, preamble detection may be performed in downlink and connection with a base station and time-frequency synchronization may be performed via transmission of a ranging signal and/or a ranging channel to the base station in uplink.

Even after pre-synchronization with the base station, in order to perform direct communication between D2D devices, synchronization between devices must be necessarily performed for accurate decoding/detection at a message/data level. When only communication between devices close to each other, the locations of which are fixed, is considered, D2D communication may be supported by synchronization with the base station only within a given cyclic prefix (CP). However, in order to support a D2D service of wider coverage and a mobile terminal, synchronization between devices should be considered.

However, for data transmission and reception under accurate synchronization between devices, when an additional synchronization signal is exchanged separately from synchronization with the base station in cellular communication, overhead and latency may occur in the D2D communication system.

For example, in general, a random access channel (RACH) signal transmitted from one terminal to a base station is transmitted to a serving base station (or a neighbor target base station upon handover). Through transmission of this RACH signal and a feedback message (i.e., RACH response message) of the base station, the terminal may simultaneously perform power adjustment and identification of the terminal accessing the network after uplink time-frequency synchronization.

However, in an existing method, D2D devices should perform a random access procedure separately from the base station and a process of performing synchronization between D2D devices must be necessarily performed. Therefore, complexity of the D2D device may be increased and power consumption of the D2D device may be increased.

DISCLOSURE

Technical Problem

An object of the present invention devised to solve the problem lies in a method for supporting efficient D2D communication.

Another object of the present invention devised to solve the problem lies in support of a D2D synchronization process using ranging signal transmission and feedback thereon in a D2D communication system.

Another object of the present invention devised to solve the problem lies in an efficient method for performing a peer discovery process for determining presence/absence of neighbor devices and identifying the neighbor devices in a D2D communication system.

Another object of the present invention devised to solve the problem lies in a method for extending a random access procedure to several neighbor D2D devices capable of performing D2D communication in addition to a base station.

Another object of the present invention devised to solve the problem lies in support of synchronization with other D2D devices and exchange of identification information by additionally transmitting an RACH signal during a peer discovery period when a terminal connected to an existing network wishes to newly perform D2D communication.

Another object of the present invention devised to solve the problem lies in a method of simultaneously performing D2D synchronization and D2D identification (e.g., neighbor device list acquisition/update process).

The technical problems solved by the present invention are not limited to the above technical problems and those skilled in the art may understand other technical problems from the following description.

Technical Solution

In order to solve the above-described problems, the present invention provides various methods for supporting a D2D synchronization process, various methods for supporting a peer discovery process, and apparatuses for supporting the same in a D2D communication system.

The object of the present invention can be achieved by providing a method for supporting device-to-device (D2D) synchronization and identification in a radio access system supporting D2D communication including a first device broadcasting a random access channel (RACH) signal for D2D synchronization during a peer discovery interval, receiving a first response message from a second device as a response to the RACH signal, and transmitting a message including device identification information of the first device to the second device.

At this time, the first response message may include device identification information, power adjustment information and time-frequency adjustment information of the second device, and the first device may synchronize with the second device based on the power adjustment information and the time-frequency adjustment information and identify a neighbor device based on the device identification information of the second device.

The first device may transmit to a base station, a scheduling request for requesting allocation of a resource region for transmitting the device identification information of the first device to the second device after receiving the first response message, and receive scheduling grant including resource allocation information indicating the allocated resource region, The message including the device identification information of the first device may be transmitted via the resource region.

In the method, the first device may receive a second response message from the base station as a response to the RACH signal, the second response message may include temporary device identification information and time-frequency adjustment information of the first device, and the first device may synchronize with the base station using the time-frequency adjustment information and the temporary device identification information may be temporarily used by the first device in a network reentry process with the base station.

the RACH signal may include at least one of an RACH sequence code for temporarily identifying the RACH signal, transmission location information of the RACH signal and/ or an opportunity index.

The first response message may be transmitted via a resource region dynamically allocated by the base station.

The first response message may be transmitted during the peer discovery interval in a contention-based manner.

In another aspect of the present invention, provided herein is a method for supporting device-to-device (D2D) synchronization and identification in a radio access system supporting D2D communication including a second device receiving a random access channel (RACH) signal broadcast for D2D synchronization from a first device during a peer discovery interval, transmitting a response message to the first device as a response to the RACH signal, and receiving a message including device identification information of the first device from the first device.

The response message may include device identification information, power adjustment information and time-frequency adjustment information of the second device, and the second device may synchronize the first device using timing synchronization information acquired from the RACH signal and identify the first device based on the device identification information of the first device.

The method may further include the second device transmitting, to a base station, a scheduling request message for requesting allocation of a resource region for transmitting the response message to the first device, and receiving scheduling grant including resource allocation information of the resource region allocated by the base station.

The response message may be transmitted via the allocated resource region.

The RACH signal may include at least one of an RACH sequence code for temporarily identifying the RACH signal, transmission location information of the RACH signal and/ or an opportunity index.

The response message may be transmitted via a resource region dynamically allocated by the base station or may be transmitted during the peer discovery interval in a contention-based manner.

In another aspect of the present invention, provided herein is a first device supporting device-to-device (D2D) synchronization and identification in a radio access system supporting D2D communication including a transmission unit, a reception unit, and a processor for supporting D2D synchronization and identification.

The processor may broadcast a random access channel (RACH) signal for D2D synchronization using the transmission unit during a peer discovery interval, receive a first response message from a second device using the reception unit as a response to the RACH signal, and transmit a message including device identification information of the first device to the second device using the transmission unit.

The first response message may include device identification information, power adjustment information and time-frequency adjustment information of the second device, and the processor may synchronize with the second device based on the power adjustment information and the time-frequency adjustment information and identify a neighbor device based on the device identification information of the second device.

The processor may transmit, to a base station, a scheduling request for requesting allocation of a resource region for transmitting the device identification information of the first device to the second device using the transmission unit after the first response message has been received and receive scheduling grant including resource allocation information indicating the allocated resource region using the reception unit. The message including the device identification information of the first device may be transmitted via the resource region.

The processor may receive a second response message from the base station using the reception unit as a response to the RACH signal, and the second response message may include temporary device identification information and time-frequency adjustment information of the first device. The processor may synchronize with the base station using the time-frequency adjustment information and the temporary device identification information may be temporarily used by the first device in a network reentry process with the base station.

The RACH signal may include at least one of an RACH sequence code for temporarily identifying the RACH signal, transmission location information of the RACH signal and/ or an opportunity index.

The aspects of the present invention are only a part of the preferred embodiments of the present invention, and various embodiments based on technical features of the present invention may be devised and understood by the person with ordinary skill in the art based on the detailed description of the present invention.

Advantageous Effects

The embodiments of the present invention have the following effects.

First, it is possible to efficiently perform D2D communication between peer devices of a D2D network.

Second, it is possible to perform a synchronization process using an existing RACH signal without overhead caused when D2D devices transmit signals for additional synchronization.

Third, D2D devices may perform a D2D identification process (e.g., neighbor device list acquisition, etc.) without transmission of a beacon signal for peer discovery through transmission of an RACH signal and transmission and reception of a response (feedback) message.

If it is difficult to perform all D2D identification processes using an RACH signal, the D2D identification processes may be performed while the beacon is transmitted and received. For example, when usable beacon signals (e.g., sequences, resources, etc.) are not present or are insufficient as a result of monitoring peripheral beacon signals, the methods proposed by the present invention may be subsidiarily applied.

Fourth, although additional message transmission and reception and a scheduling request (SR) therefor may impose a burden on a system in terms of overhead or complexity, the additional message or SR may be set using a predefined method or based on scheduling grant according to system environment.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a better understanding of the invention, illustrate embodiments of the invention and together with the description serve to explain the principle of the invention.

BEST MODE

Figure 1:
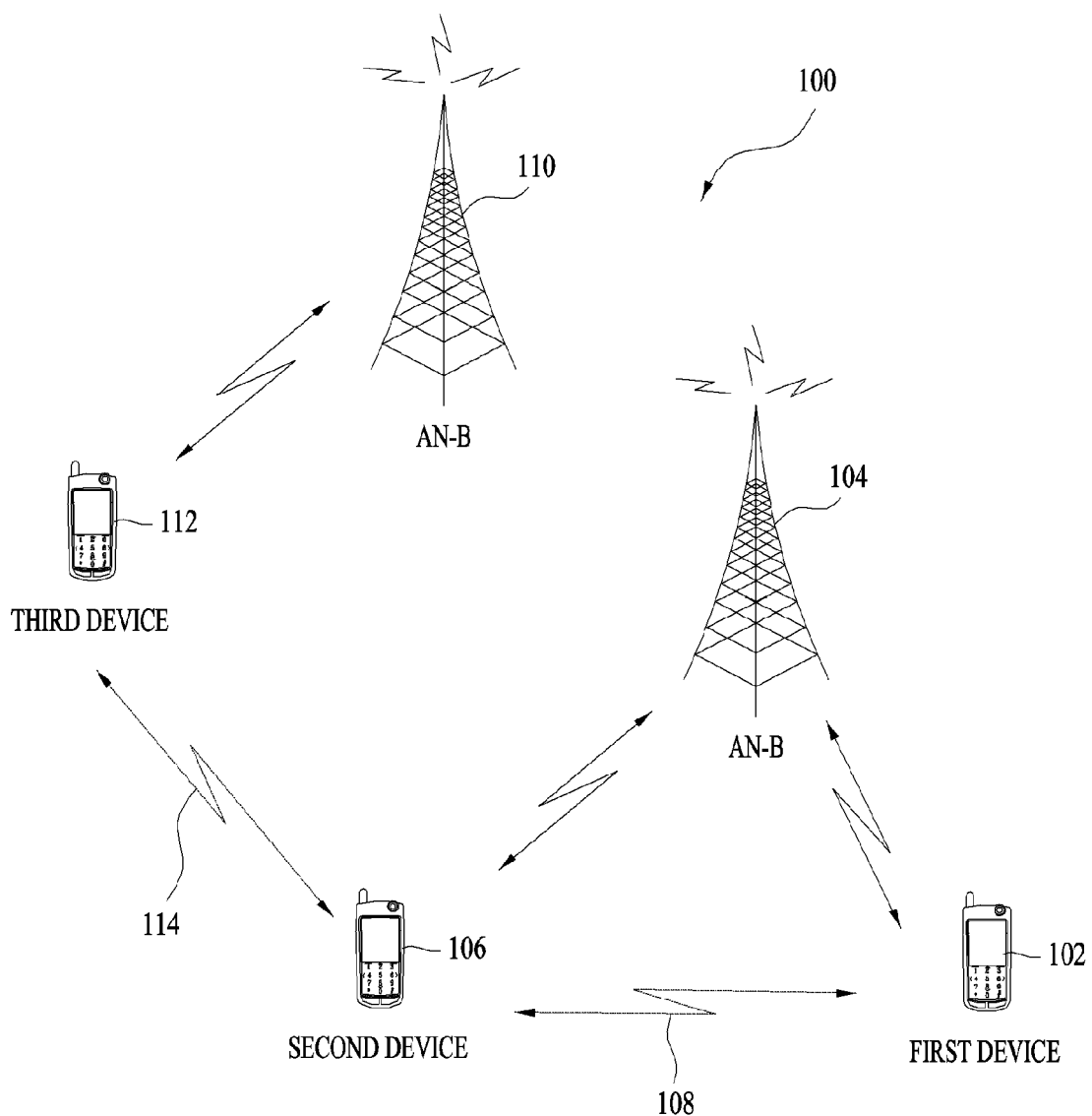
FIG. 1 is a diagram showing an example of a D2D network used in an ad hoc communication system in association with a wide area network.

Embodiments of the present invention relate to methods for efficiently performing device-to-device synchronization and device identification (that is, peer discovery) in a radio access system supporting a device-to-device communication environment and apparatuses for supporting the same.

The following embodiments are proposed by combining constituent components and characteristics of the present invention according to a predetermined format. The individual constituent components or characteristics should be considered optional on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In the description of the drawings, procedures or steps which render the scope of the present invention unnecessarily ambiguous will be omitted and procedures or steps which can be understood by those skilled in the art will be omitted.

In the present specification, the embodiments of the present invention are disclosed on the basis of a data communication relationship between peer devices. The embodiments of the present invention are applicable to a data communication relationship between a peer device and a base station (e.g., an access node) in addition to the data communication relationship between peer devices.

Here, the base station is a terminal node of a network via which the base station can directly communicate with a mobile station. Specific operations to be conducted by the base station in the present invention may also be conducted by an upper node of the base station as necessary.

In other words, it will be obvious to those skilled in the art that various operations for enabling the base station to communicate with the mobile station in a network composed of several network nodes including the base station will be conducted by the base station or other network nodes other than the base station. The term "Base Station (BS)" may be replaced with the terms fixed station, Node-B, eNode-B (eNB), advanced base station (ABS), access node (AN) or access point as necessary.

In the embodiments of the present invention, the term "D2D device" may be replaced with the terms a mobile station (MS), a user equipment (UE), a subscriber station (SS), a mobile subscriber station (MSS), a mobile terminal, an advanced mobile station (AMS), a terminal, a peer device, etc. In particular, in the present invention, the D2D device has the same meaning as a P2P device or an M2M device.

A transmitter refers to a node for transmitting a data or voice service and a receiver refers to a node for receiving a data or voice service. Accordingly, in uplink transmission, a mobile station becomes a transmitter and a base station becomes a receiver. Similarly, in downlink transmission, a mobile station becomes a receiver and a base station becomes a transmitter.

The embodiments of the present invention can be supported by the standard documents disclosed in any one of wireless access systems, such as an IEEE802.xx system, a 3$^{rd}$ Generation Partnership Project (3GPP) system, and a 3GPP2 system. That is, steps or portions, which are not described in order to make the technical spirit of the present invention clear, may be supported by the above documents.

In addition, all the terms disclosed in the present document may be understood from the above standard documents. In particular, the embodiments of the present invention may be supported by at least one of P802.16e-2004, P802.16e-2005, P802.16m, P802.16p and P802.16.1b standard documents, which are the standard documents of the IEEE802.16 system.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment through which the present invention can be carried out.

Hereinafter, the embodiments of the present invention will be described in detail with reference to the accompanying drawings so as to be easily implemented by those skilled in the art. However, the present invention may be variously implemented and is not limited to the embodiments described herein. In the drawings, in order to clearly describe the present invention, portions which are not related to the description of the present invention will be omitted and similar portions are denoted by similar reference numerals in the entire specification.

In the entire specification, when a certain portion "includes" a certain component, this does not indicate that the other components are excluded, but may be further included unless specially described. The terms "unit", "-or/er" and "module" described in the specification indicate a unit for processing at least one function or operation, which may be implemented by hardware, software and a combination thereof.

It should be noted that specific terms disclosed in the present invention are proposed for convenience of description and better understanding of the present invention, and the use of these specific terms may be changed to another format within the technical scope or spirit of the present invention.

1. General D2D Communication System

The embodiments of the present invention relate to a data channel structure and a control channel structure supporting peer-to-peer (P2P) signaling for one-to-one transmission, one-to-many transmission and many-to-one transmission. A time-frequency structure in a channel is used by pairs of transmitters and receivers in order to signal a request and a response such that traffic is transmitted on a specific traffic time slot.

The time-frequency structure is defined by a plurality of tones and symbols and a subset of tones of symbols (e.g., orthogonal frequency division multiplexing (OFDM) symbols) is used to identify a connection between specific devices. In order to further support one-to-many and many-to-one transmission in a D2D communication network, a protocol may be defined and thus a specific device may identify D2D connections to a plurality of peer devices using a set of adjacent tones and symbols in the time-frequency structure.

Tones-symbols for one-to-many D2D connections may be allocated to peer devices via paging channels and selected adjacent tones-symbols may be implicitly signaled in a protocol of a D2D communication network.

1.1 Ad-Hoc Communication Network

An ad-hoc communication system may include a D2D wireless network. In the embodiments of the present invention, the D2D wireless network may be established between two peer devices without intervention of a central network controller. For example, the D2D wireless network may operate within a frequency spectrum shared among a plurality of wireless devices.

FIG. 1 is a diagram showing an example of a D2D network used in an ad hoc communication system in association with a wide area network.

A D2D communication network and a wide area network may share the same frequency spectrum. In addition, the D2D communication network may operate within different frequency spectrum, that is, spectrum dedicated to the D2D network. A communication system 100 may include one or more wireless devices (e.g., a first device 102, a second device 106 and a third device 112). Although only three wireless devices are shown in FIG. 1, the communication system 100 may include three or more wireless devices or three or less wireless devices.

In the embodiments of the present invention, the wireless devices are D2D/P2P devices used for D2D system/D2D communication. In FIG. 1, the first device 102, the second device 106 and the third device 112 may be one of cellular phones, smartphones, laptops, small-sized communication devices, small-sized operation devices, satellite radios, global positioning systems, personal digital assistants (PDA) and arbitrary appropriate devices for communication via the wireless communication system 100.

The D2D communication system 100 may support a wide area network (WAN) and the WAN may include one or more wireless devices (e.g., the first device 102, the second device 106 and the third device 112), an arbitrary number of heterogeneous access nodes (not shown) for repeatedly receiving and transmitting wireless communication signals from and to each other, and one or more access nodes (AN) such as an AN-A 104 and an AN-B 110 in one or more sectors/cells/areas. In the present invention, the AN may be referred to as a base station (BS) or an access point (AP).

Each of the AN-A 104 and the AN-B 110 may include a plurality of transmission chains and reception chains, each of which may include a plurality of components related to transmission and reception of a wireless signal (e.g., processors, modulators, multiplexers, demodulators, demultiplexers, antennas, . . . ). The wireless devices may receive signals from the AN or transmit wireless signals to the AN when performing communication via a wide area infrastructure network supported by the communication system 100. For example, when the first device 102 and the second device 106 communicate with a network via the AN-A 104, the third device 112 may communicate with the network via the AN-B 110.

The wireless devices may directly communicate with a D2D network (e.g., an ad-hoc network) without a controller such as an AN in a local area. D2D communication may be performed by directly transmitting and receiving signals between wireless devices. Accordingly, such signals need not traverse the AN (e.g., a base station) or a central management network. The D2D network may provide short-range high data rate communication (e.g. type settings of home, office, etc.). For example, the first device 102 and the second device 106 may configure a first D2D network 108 and the second device 106 and the third device 112 may configure a second D2D network 114. At this time, the D2D network may have the same meaning as P2P link or P2P connection.

The links 108 and 114 of the D2D networks may be established between wireless devices within a similar geographical area (e.g., mutual areas). However, the wireless devices need not be related to the same sector and/or cell to be included in the common D2D network. In addition, the D2D networks may overlap each other or one D2D network may be configured within an area included in another larger D2D network.

In addition, D2D communication may be synchronized between the wireless devices. For example, the first device and the second device may use a common clock criterion in order to synchronize with each other. The first device 102 and the second device 106 may acquire timing signals from the AN-A 104. Alternatively, the first device 102 and the second device 106 may acquire timing signals from other sources (e.g., GPS satellites, television broadcast stations, etc.)

1.2 Frame Structure

Hereinafter, a frame structure which may be used in the embodiments of the present invention will be described.

Figure 2:
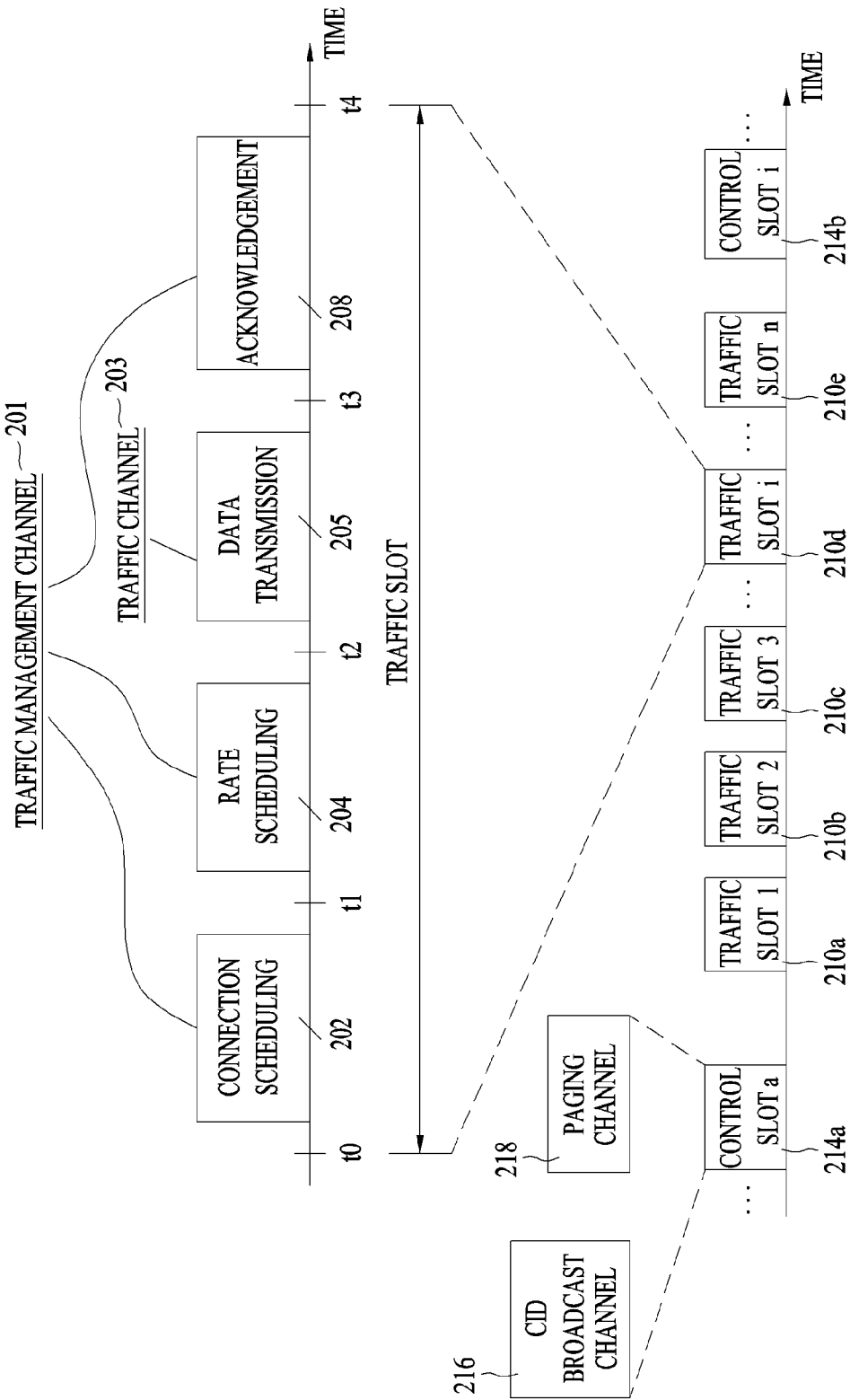
FIG. 2 is a diagram showing an example of a timing sequence of a traffic channel slot which may be used by wireless devices in order to deliver traffic after D2D communication between the wireless devices has been established.

FIG. 2 is a diagram showing an example of a timing sequence of a traffic channel slot which may be used by wireless devices in order to deliver traffic after D2D communication between the wireless devices has been established.

In FIG. 2, a time slot 201 may include a traffic management channel 201 and a traffic channel 203. The traffic management channel 201 may be used for signaling (e.g., scheduling and interference management) related to traffic data transmission in a traffic channel 205. At this time, the traffic management channel 201 may include a connection scheduling segment 202, a rate scheduling segment 204 and an acknowledgement segment 208. A data transmission segment 205 may also be referred to as a traffic channel 203. The connection scheduling segment 202, the rate scheduling segment 204, the data segment 205 and the acknowledgement segment 208 include traffic signals.

Hereinafter, for convenience of description, in FIG. 2, a wireless device for transmitting data (or traffic) is referred to as a transmission device and a wireless device for receiving data is referred to as a reception device.

The connection scheduling segment 202 may be used to notify the reception device that the transmission device is ready to transmit traffic data. The rate scheduling segment 204 enables the transmission/reception device to acquire a transmission rate and/or power to be used to transmit traffic data. Thereafter, the data transmission segment 205 is used to transmit desired traffic data at the acquired transmission rate and/or rate.

In addition, the acknowledgement segment 208 is used by the reception device to indicate that traffic data is received or is not received in the data transmission segment 205. For example, a duration of a traffic slot is about 2 milliseconds. A time sequence structure shown in FIG. 2 indicates one period of traffic slots. Before traffic data is transmitted in the traffic slot 210, a connection between the transmission device and the reception device may be established via a control slot 214.

The control slot 214 may sometimes be inserted between traffic slots. The traffic slots 210 indicate time intervals for transmitting traffic data from the transmission device to the reception device via a transport channel. Each control slot 214 may include a connection identifier (CID) broadcast channel 216 and a paging channel 218.

The control slot 214 may be generated at intervals longer than those of the traffic slots. For example, the control slot 214 may be generated every second. The control slot 214 serves to configure and maintain the D2D connection between the transmission device and the reception device. The CID broadcast channel 216 indicates D2D connection identifiers (CIDs) used by peripheral connections and may be used to indicate whether the D2D connection is alive.

For example, the transmission device and the reception device may monitor the CID broadcast channel 216 to check which CID is being used. The paging channel 218 is used by the transmission device and the reception device in order to configure new CIDs for a new D2D connection and may include a paging request channel and a paging response channel.

1.3 Connection (Link) Establishment Process of D2D Communication Network

Figure 3:
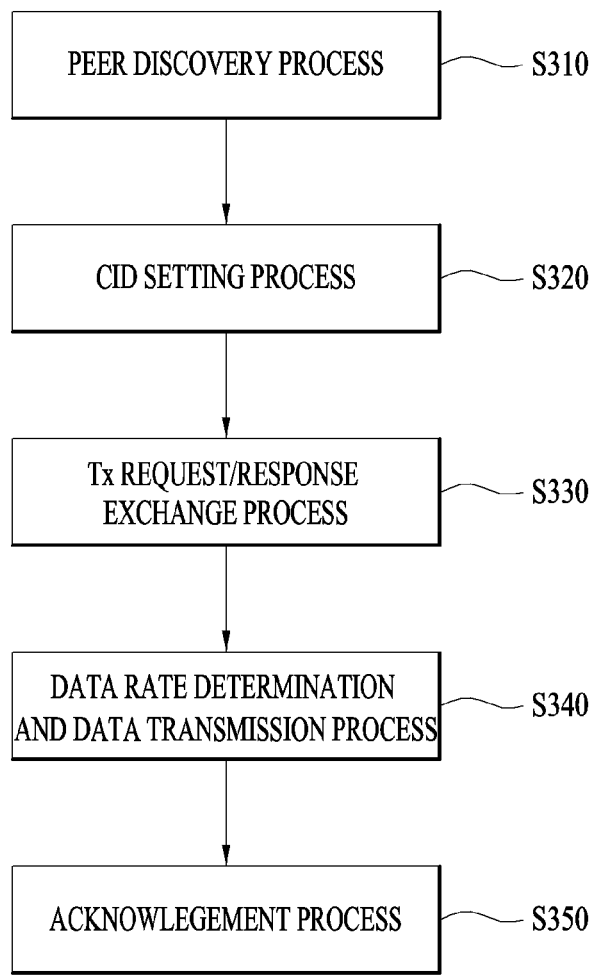
FIG. 3 is a diagram showing an example of a connection (link) establishment process used in the present invention.

FIG. 3 is a diagram showing an example of a connection (link) establishment process used in the present invention.

The connection (link) establishment process includes a peer discovery step S310, a CID setting step S320, a transmission (Tx) request and Tx response exchange step S330, a data rate determination and data transmission step S340 and an acknowledgement step S350.

The peer discovery step S310 refers to a step of identifying peer devices which perform D2D communication. Each peer device may maintain and update a device list of neighbor peer devices. Each peer device may transmit and receive a specific beacon capable of identifying to which peer device a beacon is transmitted.

The CID setting step S320 refers to a step of, at one peer device, establishing a connection with a target peer device. The peer devices set a CID between peer devices for performing D2D communication via the CID setting step.

The Tx request/response exchange step S330 refers to a step of transmitting and receiving an indication signal for transmitting and receiving actual data traffic. The peer devices transmit and receive request/response signals to and from each other to determine whether a specific peer device performs data transmission or yields data transmission for data transmission of another peer device.

The data rate determination and data transmission step S340 refers to a step of determining a data rate of data to be transmitted by a peer device and performing actual data transmission. The peer devices may transmit a specific pilot signal and receive a response signal thereto in order to determine the data rate.

The acknowledgement step S350 refers to a step of, at each peer device, transmitting ACK/NACK on data transmission to a transmission peer device.

1.4 Peer Discovery Process

Hereinafter, the peer discovery process enabling mutual detection and identification between peer devices will be described in greater detail. The peer discovery process refers to a process of, at two or more D2D wireless devices, detecting and identifying each other before traffic delivery of a D2D connection occurs.

The D2D system 100 may configure a D2D network and periodically provide short messages to peer devices (terminals) to support a peer discovery process. For example, in FIG. 1, when the first device 102 is a transmission device, the first device may periodically broadcast or transmit signals to other reception devices, that is, the second device and the third device. The periodically transmitted signals enable the second device 106 to identify the first device 102 when the second device 106 is located near the first device 102. After the second device identifies the first device, a link 108 between active devices may be established between the first device and the second device.

Wireless signals for peer discovery may be periodically transmitted during specific times referred to as peer discovery intervals. Such transmission timings may be predetermined by a protocol and may be reported to the wireless devices. The wireless devices may transmit individual signals in order to identify the wireless devices. For example, the first device and/or the second device may transmit signals during some of the peer discovery intervals. In addition, the wireless devices may monitor signals potentially transmitted by the other wireless devices during intervals other than the peer discovery intervals.

For example, the wireless signals may be beacon signals. At this time, the peer discovery interval may include a plurality of symbols (e.g., OFDM symbols). The first device 102 may select at least one symbol in the peer discovery interval. In addition, the first device 102 may transmit a signal corresponding to one tone present in a symbol selected by the first device.

After the wireless devices have discovered each other via the peer discovery process, the wireless devices may perform a connection establishment process. For example, in FIG. 1, the first device and the second device may be linked to each other via a connection process. Thereafter, the first device 102 may transmit traffic to the second device 106 using the D2D link 108. The second device 106 may also transmit traffic to the first device 102 using the D2D link 108.

2. D2D Synchronization and Identification Method—1

Figure 4:
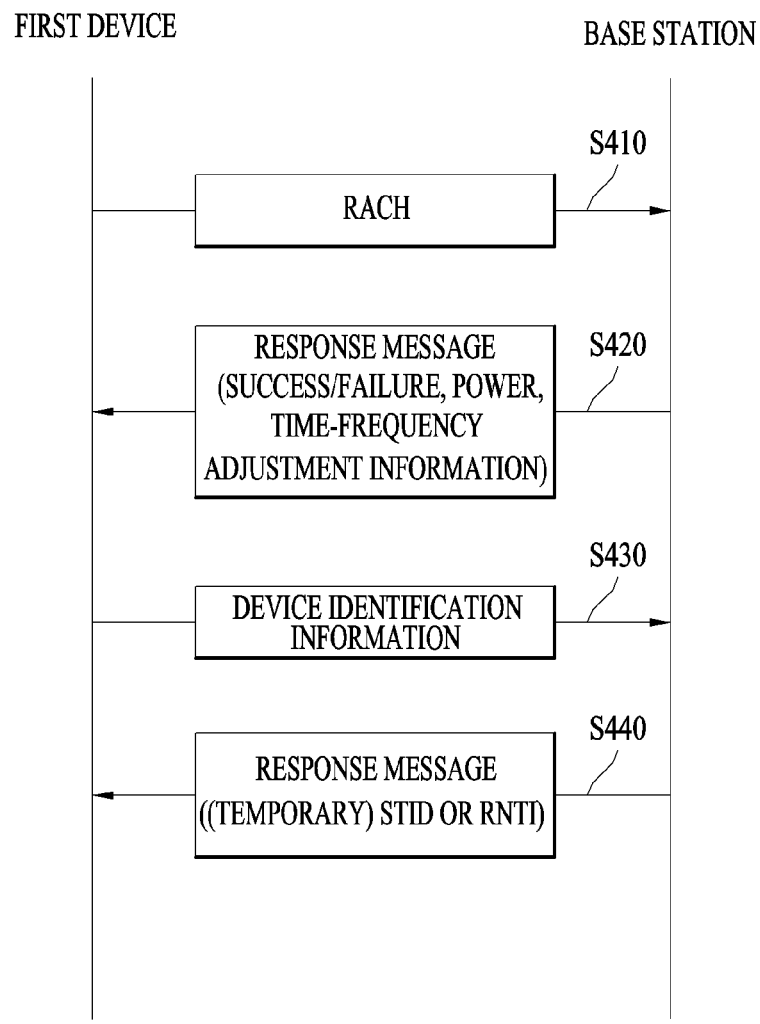
FIG. 4 is a diagram showing one of methods of performing synchronization between a terminal and a base station via a random access procedure.

FIG. 4 is a diagram showing one of methods of performing synchronization between a terminal and a base station via a random access procedure.

Referring to FIG. 4, a terminal (that is, a first device) may transmit a random access channel (RACH) signal or a ranging signal to a base station in order to perform a connection and a synchronization process with the base station (BS) (or an eNode BS) (S410).

The BS broadcasts, to terminals, a response message indicating when the RACH signal is successfully transmitted in which sequence, as feedback on the RACH signal. At this time, the response message may include information of whether the RACH signal is successfully transmitted, power adjustment value, and time-frequency adjustment information (S420).

The terminal, which has received the response message, may check whether the RACH signal transmitted thereby is successfully received. In addition, the terminal may confirm an indication for a next operation via the response message.

Thereafter, the terminal transmits device identification information (e.g., a device identifier, a medium access control (MAC) address, etc.) to the BS (S430).

As a response to the device identification information, the BS may transmit a response message including a temporary identifier (e.g., a temporary station identification (TSTID) or a radio network temporary identifier (RNTI)) to be used until the terminal performs a registration process (S440).

In FIG. 4, the RACH signal transmitted in step S410 may be referred to as a first message (Message 1) in the RACH process. In addition, the response message transmitted in step S420 may be referred to as a random access response message or a second message. The second message may include a random access preamble identifier (RAPID), a timing adjustment (TA) command for adjusting uplink transmission timing of the terminal, a scheduling grant indicating resource information allocated to the terminal for a next step and a temporary identifier.

Step S430 may be performed by a radio resource control (RRC) layer. That is, the device identification information may be transmitted to the BS via an RRC signal and a terminal identifier (C-RNTI if a connection has been established in advance) may be used as the device identification information. The RRC signal may be referred to as a third message. In addition, the response message used in step S440 may be referred to as a fourth message.

Figure 5:
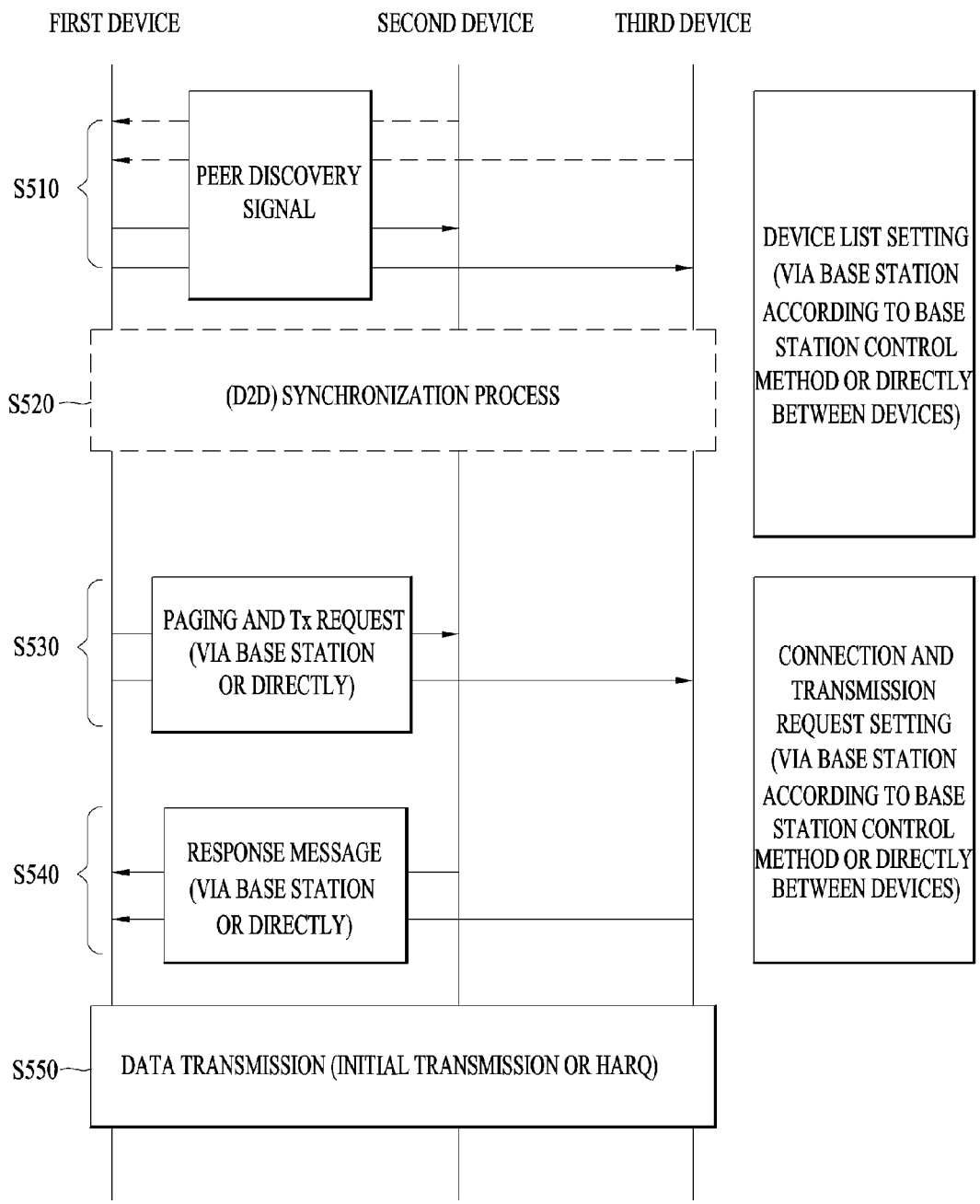
FIG. 5 is a diagram showing a process necessary when D2D devices, which have performed synchronization with a base station, transmit and receive data to and from neighbor devices.

FIG. 5 is a diagram showing a process necessary when D2D devices, which have performed synchronization with a base station, transmit and receive data to and from neighbor devices.

In FIG. 5, assume that a first device, a second device and a third device are all D2D devices and the D2D devices have been synchronized with a BS via the process of FIG. 4.

The first device, the second device and the third device transmit and receive peer discovery signals in order to perform the peer discovery process described with reference to FIG. 3 (S510).

In addition, the D2D devices perform a synchronization process (S520).

Each D2D device sets a device list via steps S510 and S520. At this time, the device list may be set via the BS according to a BS control method. For example, in an environment in which the BS may schedule data transmission request and resource allocation of the terminals, the BS may set the device list. If the BS does not control D2D communication, the device list may be directly set between devices.

Thereafter, the first device may broadcast a paging and/or transmission request message to the second device and the third device in order to set a connection and transmission request for data transmission. At this time, the paging and/or transmission request may be made via the BS or directly made between devices (S530).

The second and third devices, which have received the paging and/or transmission request from the first device, transmit response messages thereto to establish connections between D2D devices (S540).

Thereafter, the D2D devices may transmit and receive data (S550).

Hereinafter, methods for supporting a D2D synchronization process via ranging signal (or RACH signal) transmission and feedback thereon in a D2D communication system, effective methods for performing a peer discovery process for determining presence/absence of neighbor devices and identifying the neighbor devices and various methods for extending a random access procedure to several neighbor D2D devices, which may perform D2D communication, in addition to a BS will be described. The following embodiments are applicable to the methods described with reference to FIGS. 1 to 3.

Figure 6:
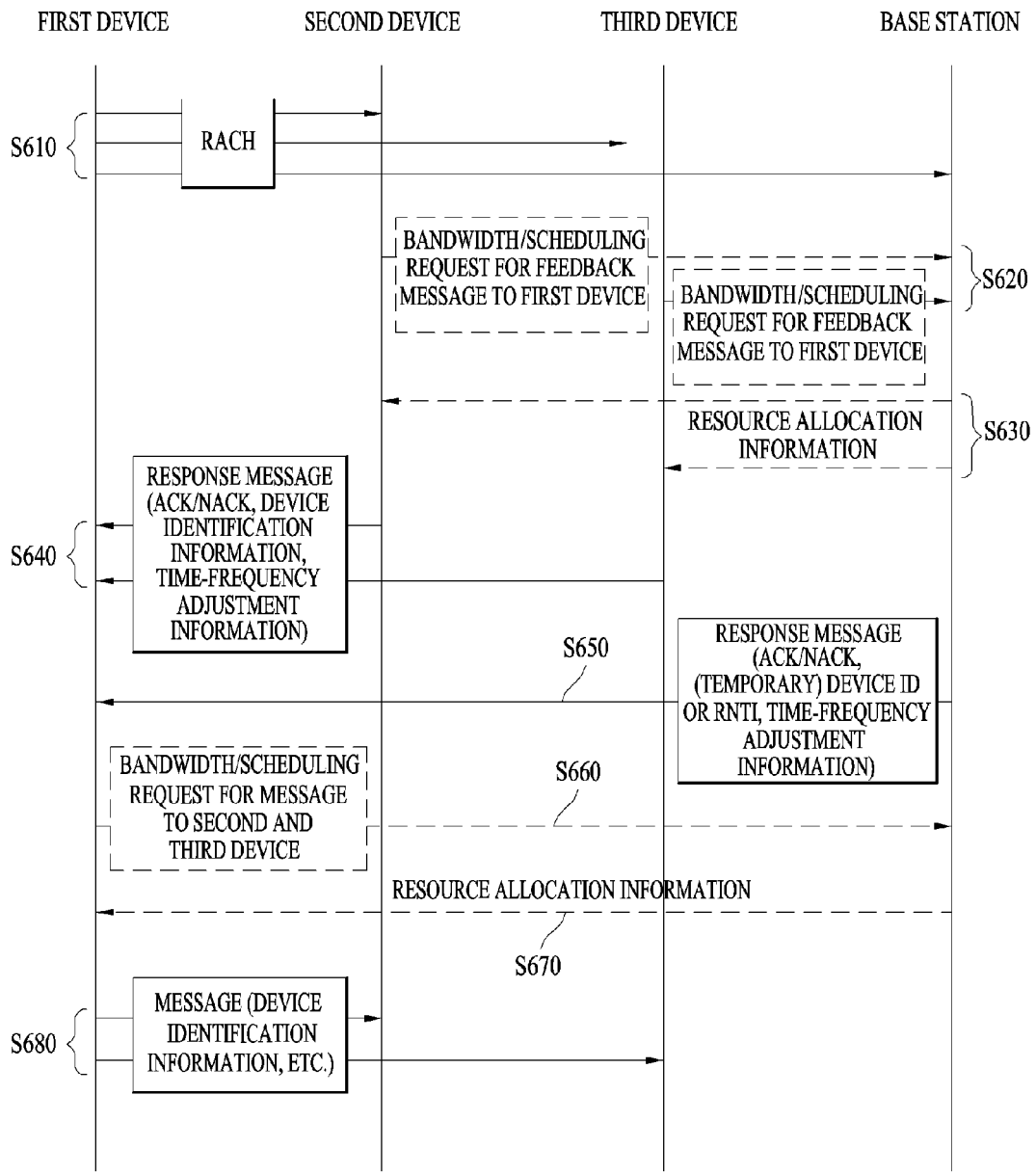
FIG. 6 is a diagram showing one of methods of, at a D2D device in an idle mode, performing synchronization with and identification of other D2D devices as an embodiment of the present invention.

FIG. 6 is a diagram showing one of methods of, at a D2D device in an idle mode, performing synchronization with and identification of other D2D devices as an embodiment of the present invention.

In FIG. 6, the first device, the second device and the third device are D2D devices. At this time, the first device is a terminal in idle mode, which reenters to a BS, and the second device and the third device are located near the first device. In addition, in FIG. 6, steps denoted by dotted lines may be selectively used.

When the first device in the idle mode attempts network reentry, the first device transmits an RACH signal (or a ranging message) to the BS in order to perform synchronization with the BS and neighbor D2D devices. At this time, the first device, which wishes to perform D2D communication along with network reentry, may simultaneously broadcast the RACH signal to the BS and neighbor devices (e.g., the second device and the third device) (S610).

2.1 RACH Signal Transmission Method

In step S610, the first device may transmit the RACH signal during a peer discovery interval defined for peer discovery between terminals (see FIG. 3). Hereinafter, a method for transmitting an RACH signal according to terminal type in step S610 will be described.

As a first terminal type, assume that the first device is a network initiated network access terminal. That is, the BS or a network requests access of the first device for D2D communication with other D2D devices.

At this time, when an interval for transmitting or receiving data/control signals (that is, a listening interval) is equal to (or overlaps) a peer discovery interval, the first device in the idle mode transmits the RACH signal to the BS during the listening interval similarly to an existing operation. When the listening interval is not equal to the peer discovery interval, the first device does not immediately transmit the RACH during the listening interval but may transmit the RACH signal during the peer discovery interval after a predetermined time (before expiration of a ranging signal transmissible window or timer predetermined by the system).

In addition, the BS may include information related to the peer discovery interval and/or information on a backoff window/offset value for RACH signal transmission in a paging message in advance and transmit the paging message (not shown). At this time, instead of the paging message, a channel for delivering system information (e.g., a physical broadcast channel (PBC)/system information block (SIB)) may be used.

As a second terminal type, assume that the first device is a voluntary network access terminal. That is, the first device voluntarily accesses a network in order to receive a D2D service.

Generally, such device does not receive information on an interval for network access from the BS. Accordingly, if the first device knows information on the peer discovery interval, the first device may transmit the RACH signal during the peer discovery interval and, if the first device does not know the information on the peer discovery interval, the first device may receive information on the peer discovery interval and/or the backoff window/offset value via the BS as system parameters and then transmit the RACH signal.

2.2 RACH Signal Identification Method

Returning to step S610 of FIG. 6, in FIG. 6, neighbor terminals (the second device and the third device), which may detect the RACH signal transmitted from the first device, may be included in the neighbor device list of the first device (In this case, each D2D device preferably includes a module for receiving/detecting the RACH signal).

In order for neighbor devices to detect the RACH signal and to determine which D2D device transmits the RACH signal, in step S610, the first device preferably transmits the RACH signal including information for identifying the first device. Since the RACH signal is information of a sequence level, terminal identification information may not be included until burst transmission of a message level due to security.

Accordingly, as the information for identifying the first device, an RACH sequence code arbitrarily selected by the first device, transmission location information of the RACH signal (e.g., information on a superframe, a frame and/or a subframe) and/or an opportunity index if supported by a D2D system may be temporarily used.

At this time, the information for identifying the first device may be indicated via a random access ID (RAID) for masking the RACH signal. The information for identifying the first device may be mapped to identification information of a device identifier (that is, terminal identifier) level in the future or may be signaled by directly transmitting a message including the identification information of the first device from the first device (or the BS) to neighbor devices.

The maximum number of cases in which the device is identified by the RACH sequence code used in the RACH signal may be 32 in a system supporting 32 sequence code sets. If D2D devices select the same sequence code and perform transmission, the device may be temporarily identified via the remaining information of the RACH signal (e.g., transmission location information or opportunity index). However, since an opportunity for transmitting the RACH signal at the first device may be arbitrarily selected within a predetermined backoff window, the same sequence code is hardly selected when only the neighbor device list is considered.

2.3 Response Message Transmission Method

Returning to FIG. 6, the neighbor D2D devices (the second device and the third device), which have successfully detected the RACH signal of the first device transmitted in step S610, may temporarily add and update the first device in the neighbor device list based on the sequence code information, transmission location information and/or opportunity index information of the detected RACH signal. At this time, the neighbor device list may be variously defined in a range supported by the system using the sequence code information, transmission location information and/or opportunity index information.

In addition, the second device and/or third device may be synchronized with the first device using timing synchronization information. At this time, the second device and/or the third device may transmit a response message (e.g., a feedback message) to the first device for accurate time-frequency synchronization and mutual identification with the first device (S640).

In step S640, the response message may include reception status information (e.g., success/abort/failure status) of the RACH signal transmitted by the first device, power adjustment information of the first device and/or time-frequency adjustment information (e.g., timing advance (TA) related information).

If the BS has already allocated identification information to the second device and/or the third device (or if the second device and/or the third device already have identification information), the second device and the third device may transmit the terminal identification information (e.g., terminal ID or D2D device ID) to the first device using the response message of step S640. Accordingly, the first device may check which neighbor devices have acquired the RACH signal broadcast thereby. Accordingly, after the first device has received the response message as the response to the RACH signal, the first device may store information on neighbor devices. In addition, the first device may (temporarily) add/update the neighbor device list thereof using the information.

In order to transmit and receive the D2D response message in step S640 of FIG. 6, there is a need for resource allocation information for transmitting and receiving the response message. When the second device and/or the third device arbitrarily transmit response messages at the same time without allocating/distributing resources for transmitting and receiving the response message, a problem may occur when the first device detects the response messages and interference with other D2D devices may be unnecessarily caused.

In an environment or system in which a BS may transmit scheduling grant for a response message, the second device and/or the third device, which have detected the RACH signal of the first device, may request allocation of resources for feeding the response message back to the first device, which has transmitted the RACH signal, from the BS. For example, the second device and/or the third device may transmit a bandwidth request (BR) signal or a scheduling request (SR) signal to the BS to request allocation of resources for transmitting the response message (S620).

When the BS receives the BR signal or the SR signal from the second device and/or the third device, the BS may allocate resources for transmitting the response message and transmit resource allocation information indicating the allocated resources to the second device and/or the third device (S630).

At this time, the BS may broadcast the resource allocation information such that the first device receives the resource allocation information transmitted to the second device and/or the third device. Alternatively, the BS may transmit the resource allocation information masked with an identifier identifiable by the first device, in order for the first device to efficiently receive and decode the response message to be transmitted from the second device and/or the third device. The identifier identifiable by the first device may be included in the RACH signal transmitted by the first device.

Steps S620 and S630 may be used when the BS may allocate resources to the D2D devices in the RACH process. That is, steps S620 and S630 may be selectively used.

In FIG. 6, it is difficult for the BS to allocate and schedule resources with respect to all response messages. In this case, the response message of step S640 may be transmitted and received during a predefined transmission interval, such as a peer discovery interval, for D2D communication. For example, during the peer discovery interval, transmission and reception of the response message may be performed using a D2D contention method.

In this case, the following feedback transmission methods are applicable to step S640.

As a first method, in a D2D communication system, a specific backoff window interval for transmitting a response message is set in a peer discovery interval and D2D devices may arbitrarily select an opportunity (or a time-frequency offset) for transmitting a response message during the backoff window interval and perform transmission. Such a backoff window is commonly applicable to all D2D devices.

As a second method, an interval and a size thereof may be determined according to quality of service (QoS) of each D2D device, service flow and/or communication priority of each D2D device.

In step S610, the RACH signal is transmitted to the neighbor D2D devices and the BS. Accordingly, the BS transmits the response message to the first device as a response to the RACH signal. At this time, the response message may include status information of the RACH signal, (temporary) device identification information (TS-TID or RNTI), power adjustment information and/or time-frequency adjustment information (S650).

Referring to FIG. 6, the first device, which has received the response message in steps S640 and S650, may transmit a message including the identification information thereof to the neighbor devices. Accordingly, the first device may transmit a BW or SR to the BS in order to request allocation of resources for transmitting the message (S660).

The BS may allocate radio resources for transmitting the message as a response thereto and transmit scheduling grant including resource allocation information of the allocated radio resources to the first device (S670).

The BS may broadcast this information such that the second device and/or the third device receive the scheduling grant including the resource allocation information in order for the second device and/or the third device to efficiently receive/decode a message to be transmitted from the first device in the future or mask the scheduling information with an identifier identifiable by the second device and/or the third device to perform transmission.

Steps S660 and S670 may be selectively performed. That is, these steps may be performed when the BS may allocate resources to the first device in the RACH process.

The first device, which has received the resource allocation information from the BS, may transmit the identification information thereof (e.g., a terminal identifier or a D2D device ID) to neighbor D2D devices (S680).

In step S680, the first device may not transmit the identification information of the first device to the second device and/or the third device but the BS may transmit the identification information of the first device to the second device and/or the third device. In such a method, the BS may transmit the identification information using a message of the access/synchronization process performed by neighbor devices and the BS or a newly defined message.

In an environment in which it is difficult for the D2D communication system to allocate resources for step S680, the first device may transmit the message of step S680 to the second device and/or the third device during the peer discovery interval in a contention-based manner among the above-described methods.

In FIG. 6, the first device may identify neighbor devices and update the neighbor device list based on the device identification information of the second device and/or the third device received in step S640 and synchronize with the second device and/or the third device based on time-frequency adjustment information and power adjustment information. In addition, the second device and/or the third device may perform timing synchronization from the RACH signal transmitted by the first device.

In the embodiments of the present invention, assume that the synchronization process considers one transmission direction (e.g., an uplink direction or a downlink direction). For example, assume that synchronization is already performed in a direction in which the second device and/or the third device transmit data to the first device. Accordingly, in the embodiments of the present invention, a synchronization process for transmitting data from the first device to the second device and/or the third device will be focused upon.

In one aspect of the embodiment of the present invention, a specific timer for an RACH signal may be defined. For example, the timer may be defined from a time when the first device transmits the RACH signal to a time when the first device receives response messages from neighbor D2D devices.

That is, after the first device broadcasts the RACH signal in step S610, the timer operates. If no response message (feedback) is received from the neighbor D2D devices before the timer expires (if none of the neighbor D2D devices receives the RACH signal, if the neighbor D2D devices transmit response messages but the first device does not receive the response messages or if transmission and reception of BW/SR signals transmitted from the neighbor D2D devices to the BS fails), the first device may transmit an indication or negative acknowledgement signal indicating that the response message has not been received from the BS.

If the BS receives the indication or negative acknowledgement signal from the BS, the BS may notify the neighbor D2D devices, that is, the second device and/or the third device, of this information and trigger reattempt of the feedback transmission process.

In another aspect of the embodiment of the present invention, if synchronization of the link for transmitting response messages from the neighbor D2D devices to the first device is not performed or if synchronization should be performed, the neighbor devices may perform the same process as the process performed by the first device with respect to the neighbor devices.

The first device and the neighbor devices, that is, the second device and/or the third device, acquire mutual identification information for the D2D service and perform synchronization via the process of FIG. 6. Subsequent processes (e.g., a paging transmission request/response (Tx request/response), a data transmission process, etc.) are similarly applicable to general D2D communication.

In the embodiments of the present invention, a terminal ID and a D2D terminal ID may be equal or different in terms of domain. That is, the D2D terminal ID may be additionally allocated for D2D communication or may be configured and used in a domain different from that of the terminal ID. Mapping between the two ID domains may be variously defined and used according to system configuration and environment.

3. Other Embodiments 3.1 Case in which RACH Signal is not Transmitted

If a D2D communication device in a connected mode requests D2D communication or if a D2D device does not transmit an RACH signal for access for any reason, transmission of the RACH signal is not performed between D2D devices. Accordingly, there is a need for a method for transmitting an RACH signal in order to perform synchronization and identification between D2D devices. The first device may request, from the BS, allocation of resources for the RACH signal to be transmitted in order to perform synchronization and identification with the second device and/or the third device.

If the D2D communication system allows transmission and reception of the RACH signal in a dynamic manner, the BS may transmit resource allocation information for RACH transmission to the first device via a control signal/channel (e.g., a MAP message of an 802.16m system, a PDCCH of a 3GPP LTE system or a new E-PDCCH configured in a system supporting D2D communication). At this time, the control signal including the resource allocation information may be allowed to only the first device or may be shared with other D2D devices.

If the system fixedly (or periodically) allows transmission and reception of the RACH signal and resources for transmitting the RACH signal are predetermined, the first device may perform transmission of the RACH signal using predetermined resources without a separate scheduling request. In this case, the first device may contend with the other D2D devices for the resources.

3.2 Message Including Device Identification Information

In FIG. 6, after the first device has received the feedback message from the neighbor devices, that is, the second device and/or the third device, other information may be additionally included in the message for transmitting the identification information.

For example, information on a transmission (Tx) request which is a signal indicating that there is data to be transmitted by the first device, quality of service (QoS) of data to be transmitted, information on a target data rate, etc. may be included. In addition, a power level, a timing advance (TA) value, etc. transmitted by the first device may be further included based on information included in the response message transmitted by the second device and/or the third device.

3.3 RACH Process which is not Related to the Peer Discovery Interval

In FIG. 6, it may be difficult for the first device, which is a D2D device in idle mode, to reenter the network and to wait for the peer discovery interval for transmitting the RACH signal. At this time, the first device may transmit an SR/BW for transmitting the RACH signal to the BS in order to perform synchronization and device identification with the second device and/or the third device regardless of the peer discovery interval.

The BS may allocate a resource region for transmitting the RACH signal via a specific control channel in a dynamic manner and transmit resource allocation information of the allocated resource region to the first device, as a response thereto.

In this case, since the RACH signal is not transmitted during the peer discovery interval, the neighbor devices, that is, the second device and/or the third device, may not receive the RACH signal from the first device. Accordingly, the BS may broadcast (multicast) an indication message including an indication of preparing for reception of the RACH signal from the first device which desires a D2D service.

Such an indication message may be a specific multicast message which may be received by D2D devices without reentry to the network. Alternatively, the indication message may be a message or control channel including system information which should be unconditionally decoded by the D2D devices before network reentry. For example, as the indication message, a secondary super frame header (S-SFH) or advanced air interface (AAI)-system configuration descriptor (SCD) message used in an IEEE 802.16m system or a physical broadcast channel (PBCH) or a system information block (SIB) used in a 3GPP LTE system may be used.

The second device and/or the third device may prepare for provision of a D2D service to other D2D devices via the indication message. Alternatively, the second device and/or the third device may reject D2D service provision. In this case, the second device and/or the third device may feed a confirmation type message back to the BS.

4. D2D Synchronization and Identification Method—2

A method for directly transmitting a response message from a BS to neighbor D2D devices in order to reduce transmission overhead of messages exchanged between a first device and neighbor D2D devices and a scheduling request (RS)/grant therefor or to solve a problem that message transmission is difficult because synchronization of a link for transmitting a response (feedback) message from neighbor D2D devices to the first device is not performed will be described.

Figure 7:
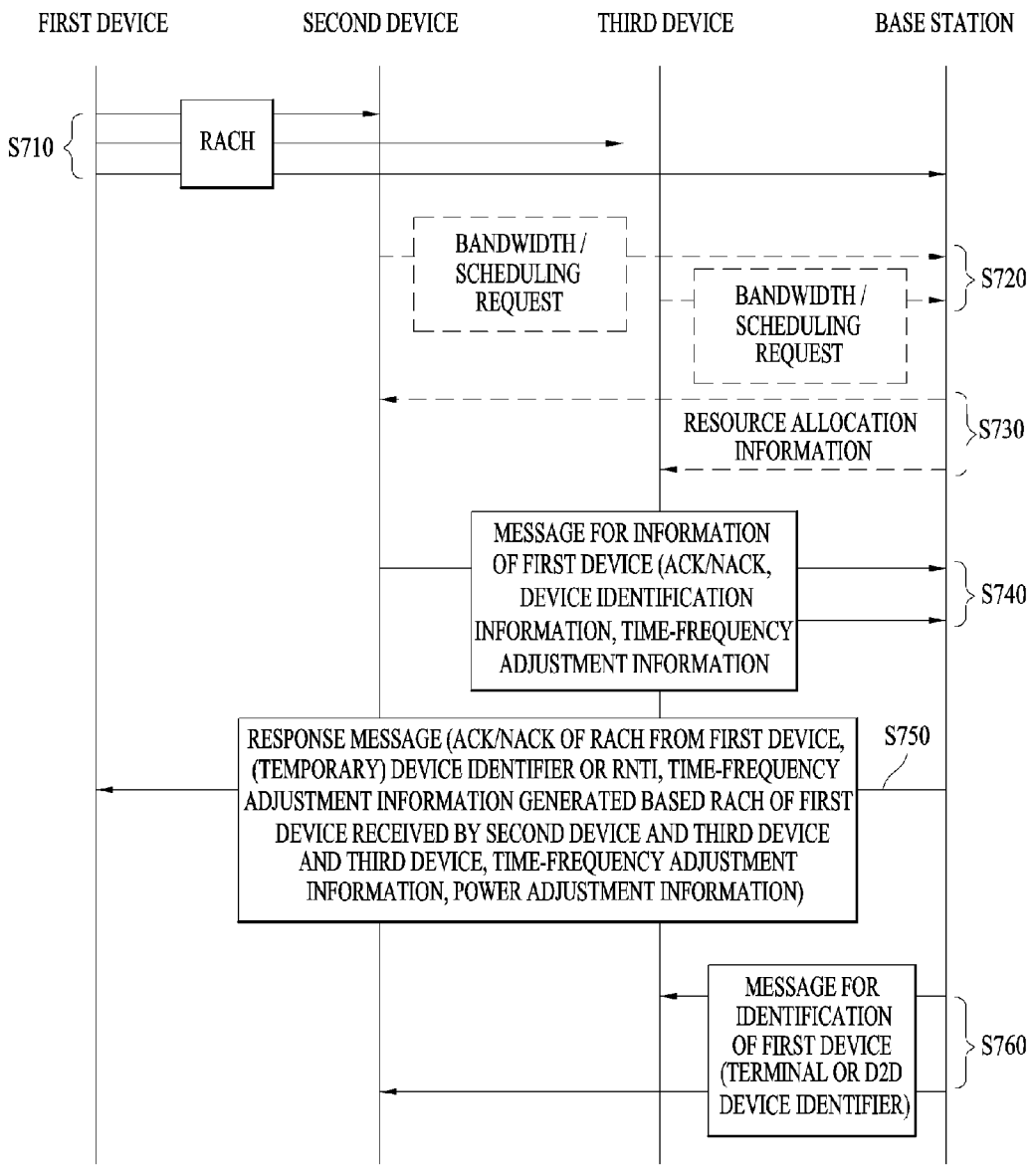
FIG. 7 is a diagram showing a process of performing synchronization and identification between D2D devices as an embodiment of the present invention.

FIG. 7 is a diagram showing a process of performing synchronization and identification between D2D devices as an embodiment of the present invention.

In FIG. 7, a first device, a second device and a third device are D2D devices. In FIG. 7, steps denoted by dotted lines may be selectively used. At this time, the first device is a terminal in an idle mode, which reenters a BS, and the second device and the third device are located near the first device.

The first device transmits an RACH signal (or a ranging message) to the BS. At this time, the first device, which wishes to perform D2D communication along with network reentry, may simultaneously broadcast the RACH signal to the BS and neighbor devices (e.g., the second device and the third device) (S710).

The second device and/or the third device, which have received the RACH signal from the first device, may transmit, to the BS, a bandwidth request (BW)/scheduling request (SR) signal for transmitting a message including information on the first device to the BS (S720).

When the BW/RS signal is received, the BS may allocate a resource region for transmitting and receiving the message and transmit a scheduling grant message including resource allocation information of the allocated resource region to the second device and/or the third device (S730).

The neighbor D2D devices, which have received the scheduling grant from the BS, transmit, to the BS, a message including information generated based on the RACH signal received from the first device (e.g., ACK/NACK of RACH reception, power adjustment information, time-frequency adjustment information) and identification information thereof (S740).

The BS, which has received the message in step S740, transmits a response message including the following two pieces of information to the first device (S750).

First, in the response message of step S750, first information generated based on the RACH signal received by the BS from the first device (e.g., ACK/NACK of RACH signal reception of the first device, (temporary) device identifier or RNTI, time-frequency adjustment information and/or power adjustment information) may be included.

In addition, in the response message, second information included in the message received from the second device and/or the third device in step S740 (e.g., ACK/NACK of RACH signal reception of the first device, identification information of the second device and/or the third device, time-frequency adjustment information and/or power adjustment information) may be further included.

In addition, the BS may transmit a message including the identification information of the first device (e.g., a terminal identifier or a D2D device identifier) to the second device and/or the third device (S760).

The second device and/or the third device, which have received the message in step S760, may add/update the neighbor device list based on the device identification information of the first device.

The first and second information described with reference to FIG. 7 may be transmitted via the same response message S750. Alternatively, the first information may be transmitted via a response message and the second information may be transmitted via an additional message. In addition, steps S720 and S730 denoted by dotted lines may be selectively used. For example, if a predetermined resource region is present for transmission/reception of the message of step S740, steps S720 and S730 are not necessary. In this case, the second device and/or the third device may transmit the message of step S740 to the BS via the predetermined resource region.

5. General D2D Device

In the embodiments of the present invention, communication between D2D devices refers to communication performed between devices via a BS or between a BS and devices without human intervention or communication between D2D devices without intervention of a BS. Accordingly, the D2D device refers to a terminal which can support communication of the D2D device.

An access service network for a D2D service is defined as a D2D access service network (ASN) and a network entity communicating with D2D devices is referred to as a D2D server. The D2D server performs a D2D application and provides a D2D-specific service for one or more D2D devices. A D2D feature is a feature of a D2D application and one or more features may be necessary to provide the application. A D2D device group refers to a group of D2D devices sharing one or more features.

The number of devices which perform D2D communication (may be referred to as a D2D device, a D2D communication device, etc.) may be gradually increased as the number of machine application types has increased.

Examples of the machine application type include, but are not limited to, (1) security, (2) public safety, (3) tracking and tracing, (4) payment, (5) healthcare, (6) remote maintenance and control, (7) metering, (8) consumer device, (9) fleet management in point of sale (POS) and security application markets, (10) inter-device communication in a vending machine, (11) smart meters for measuring operation times of construction equipment or automatically measuring heat and electricity consumption, (12) surveillance video communication of a surveillance camera, etc. The machine application type is not limited thereto and various other machine application types are applicable.

Figure 8:
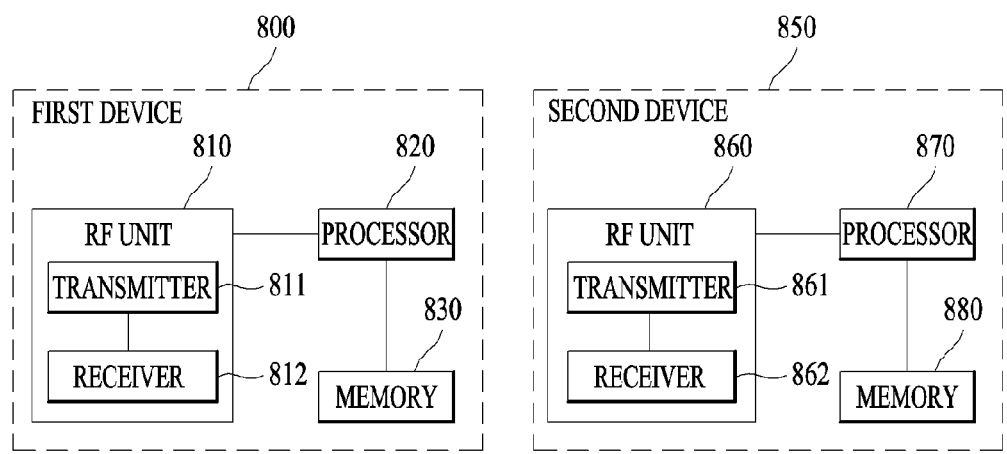
FIG. 8 is a schematic diagram illustrating the configuration of peer devices, to which the embodiments of the present invention described with reference to FIGS. 1 to 7 are applicable, as an embodiment of the present invention.

FIG. 8 is a schematic diagram illustrating the configuration of peer devices, to which the embodiments of the present invention described with reference to FIGS. 1 to 7 are applicable, as an embodiment of the present invention.

In FIG. 8, a first device 800 and a second device 850 as peer devices may include RF units 810 and 860, processors 820 and 870, and optionally memories 830 and 880, respectively. Although two D2D devices are shown in FIG. 8, a plurality of D2D devices may establish a D2D communication environment.

The RF units 810 and 860 may include transmitters 811 and 861 and receivers 812 and 862, respectively. For example, the transmitter 811 and the receiver 812 of the D2D device 800 are configured to transmit and receive a signal to and from the BS 850 and other D2D devices. The processor 820 is functionally connected to the transmitter 811 and the receiver 812 and is configured to control a process of, at the transmitter 811 and the receiver 812, transmitting and receiving a signal to and from other devices. The processor 820 processes and transmits a signal to be transmitted to the transmitter 811 and processes a signal received by the receiver 812.

If necessary, the processor 820 may store information included in an exchanged message in the memory 830. The D2D device 800 may perform the methods of the following various embodiments using the above-described structure.

Although not shown in FIG. 8, the D2D device 800 may further include various units according to machine application type. If the D2D device 800 is an intelligent meter, the D2DM device 800 may further include a power measurement unit. Such a power measurement unit may be controlled by the processor 820 shown in FIG. 8 or a separate processor (not shown).

Although FIG. 8 shows, by way of example, the case in which communication between one or more D2D devices is performed, D2D communication may be performed between the D2D device 800 and the BS. At this time, the devices may perform methods according to the below-described embodiments using the same configuration as the device shown in FIG. 8.

For example, in FIG. 8, the second device 850 may be a BS. The transmitter 861 and the receiver 862 of the BS are configured to transmit and receive a signal to and from another BS, a D2D server or D2D devices. The processor 870 is functionally connected to the transmitter 861 and the receiver 862 and is configured to control a process of, at the transmitter 861 and the receiver 862, transmitting and receiving a signal to and from other devices. The processor 870 processes and transmits a signal to be transmitted to the transmitter 861 and processes a signal received by the receiver 862. If necessary, the processor 870 may store information included in an exchanged message in the memory 830. The BS 850 may perform the methods of the following various embodiments using the above-described structure.

In FIG. 8, the processors 820 and 870 of the M2M device 810 and the BS 850 instruct (for example, control, adjust, or manage) the operations of the first device 810 and the second device 850, respectively. The processors 820 and 870 may be connected to the memories 830 and 880 for storing program code and data, respectively. The memories 830 and 880 are respectively connected to the processors 820 and 870 so as to store operating systems, applications and general files.

The processors 820 and 870 may be called controllers, microcontrollers, microprocessors, microcomputers, etc. The processors 820 and 870 may be implemented by hardware, firmware, software, or a combination thereof. If the embodiments of the present invention are implemented by hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. may be included in the processors 820 and 870.

If the embodiments of the present invention are implemented by firmware or software, the firmware or software may be configured to include modules, procedures, functions, etc. for performing the functions or operations of the present invention. The firmware or software configured to perform the present invention may be included in the processors 820 and 870 or may be stored in the memories 830 and 880 so as to be executed by the processors 820 and 870.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious that claims that are not explicitly cited in each other in the appended claims may be presented in combination as an embodiment of the present invention or included as a new claim by subsequent amendment after the application is filed.

INDUSTRIAL APPLICABILITY

The embodiments of the present invention are applicable to various radio access systems. Examples of various radio access systems include a $3^{rd}$ generation partnership project (3GPP), 3GPP2 and/or Institute of Electrical and Electronic Engineers 802 (IEEE 802.xx) system. The embodiments of the present invention are applicable to all technical fields using the various radio access systems in addition to the various radio access systems.

The invention claimed is:

1. A method performed by a first device for supporting simultaneous synchronization with a base station (BS) and identification of and synchronization with other devices in a radio access system supporting device-to-device (D2D) communication, the method comprising:
broadcasting a random access channel (RACH) signal for synchronization with the BS and the other devices when in an idle mode during a peer discovery interval defined for peer discovery between the first device and the other devices;
receiving a first response message from a second device among the other devices and a second response message from the BS in response to the RACH signal;
synchronizing with the second device and identifying the second device based on information included in the first response message; and
synchronizing with the BS based on information included in the second response message.

2. The method according to claim 1, further comprising:
transmitting a message to the second device including device identification information of the first device.

3. The method according to claim 1, wherein:
the second response message includes temporary device identification information of the first device and time-frequency adjustment information;
synchronizing with the BS comprises using the time-frequency adjustment information; and
the temporary device identification information is temporarily used in a network reentry process with the BS.

4. The method according to claim 1, wherein the RACH signal includes at least a RACH sequence code for temporarily identifying the RACH signal, transmission location information of the RACH signal or an opportunity index.

5. The method according to claim 1, wherein:
the first response message includes device identification information of the second device, power adjustment information and time-frequency adjustment information;
synchronizing with the second device is based on the power adjustment information and the time-frequency adjustment information; and
identifying the second device is based on the device identification information.

6. A first device supporting simultaneous synchronization with a base station (BS) and identification of and synchronization with other devices in a radio access system supporting device-to-device (D2D) communication, the first device comprising:
a transmission unit configured to transmit information;
a reception unit configured to receive information; and
a processor configured to:
control the transmission unit to broadcast a random access channel (RACH) signal for synchronization with the BS and the other devices in an idle mode during a peer discovery interval defined for peer discovery between the first device and the other devices;
control the reception unit to receive a first response message from a second device among the other devices and a second response message from the BS in response to the RACH signal;
synchronize with the second device and identify the second device based on information included in the first response message; and
synchronize with the BS based on information included in the second response message.

7. The first device according to claim 6, wherein the processor is further configured to:
control the transmission unit to transmit a message to the second device including device identification information of the first device.

8. The first device according to claim 7, wherein:
the second response message includes temporary device identification information of the first device and time-frequency adjustment information;
the processor is further configured to synchronize with the BS using the time-frequency adjustment information; and
the processor is further configured to temporarily use the temporary device identification information in a network reentry process with the BS.

9. The first device according to claim 7, wherein the RACH signal includes at least a RACH sequence code for temporarily identifying the RACH signal, transmission location information of the RACH signal or an opportunity index.

10. The first device according to claim 6, wherein:
the first response message includes device identification information of the second device, power adjustment information and time-frequency adjustment information;
the processor is further configured to synchronize with the second device based on the power adjustment information and the time-frequency adjustment information; and
the processor is further configured to identify the second device based on the device identification information of the second device.

* * * * *